(12) United States Patent
Zavitz et al.

(10) Patent No.: US 6,318,034 B1
(45) Date of Patent: Nov. 20, 2001

(54) ELEVATED STORAGE TANK

(75) Inventors: Bryant A. Zavitz, Dunwoody, GA (US); James B. Tysse, Yorkville, IL (US); William J. Czaska, Bolingbrook, IL (US); Steven R. Brock, Wheaton, IL (US)

(73) Assignees: Tindall Corporation, Petersburg, VA (US); Chicago Bridge & Iron Company, Plainfield, IL (US)

( * ) Notice: Subject to any disclaimer, the term of this patent is extended or adjusted under 35 U.S.C. 154(b) by 0 days.

(21) Appl. No.: 09/520,870

(22) Filed: Mar. 8, 2000

(51) Int. Cl.$^7$ .............................. E04H 12/30; E03B 11/12
(52) U.S. Cl. .................................. 52/194; 52/40
(58) Field of Search .................... 52/192, 194, 40, 52/236.1, 236.2; 220/567; D25/6, 14, 31, 32

(56) References Cited

U.S. PATENT DOCUMENTS

| | | | |
|---|---|---|---|
| 3,363,795 | * | 1/1968 | Stuart, III ........................... 220/567 |
| 4,155,210 | * | 5/1979 | de Leaumont ...................... 52/236.2 |
| 4,327,531 | * | 5/1982 | Cazaly et al. ......................... 52/194 |

\* cited by examiner

*Primary Examiner*—Michael Safavi
(74) *Attorney, Agent, or Firm*—Marshall, Gerstein, & Borun (57) ABSTRACT

An elevated water storage tank comprises a reservoir supported by a pedestal with a concrete bell portion supporting a cylindrical shaft section that is no more than one quarter the width of the reservoir. The bell portion has a polygonal cross-section with sloping sides and is constructed of a series of upstanding segments having relatively long lower edges, relatively short upper edges, and converging side edges. The cylindrical shaft section is situated on top of the bell portion with the reservoir situated atop the cylindrical shaft. The cylindrical shaft formed of a plurality of sections extending from the bell portion to the reservoir.

46 Claims, 10 Drawing Sheets

ELEVATED STORAGE TANK

BACKGROUND OF THE INVENTION

This invention relates generally to elevated storage tanks, such as those used by municipalities for storing drinking water, In particular, the invention relates to water tanks that have a pedestal section made of reinforced concrete.

As described in U.S. Pat. No. 5,131,201, two kinds of elevated storage tanks have been in common use in the United States. WATERSPHEROID® tanks, such as those built by Chicago Bridge & Iron Company, have a slender steel pedestal supporting the reservoir. The use of steel for the pedestal permits the lower section of the pedestal to be readily formed into a bell shape that flares outwardly at the base to provide the stability needed in such tanks. Composite elevated storage tanks, on the other hand, are generally built with cast-in-place concrete pedestals to reduce costs. For ease of construction, concrete pedestals are generally cylindrical (that is, the cross-section does not vary with height). In order to provide the necessary stability for such tanks, two alternative designs for concrete pedestals have found general acceptance. One alternative design features a relatively wide pedestal, as illustrated in U.S. Pat. No. 5,131,201. An alternative design features multiple pedestals (or "legs") spaced about the central axis of the tank. While either of these kinds of concrete pedestals can be less expensive than a comparable steel pedestal, current designs for concrete pedestals are believed to be unnecessarily costly to build.

What is needed is a more cost-effective design for a concrete pedestal for a composite elevated storage tank that meets the strength and stability requirements demanded for such tanks.

SUMMARY OF THE INVENTION

The invention relates to an elevated water tank with a concrete pedestal having a pyramidal bell portion that has a polygonal cross-section. The bell portion can be efficiently constructed using a series of upstanding precast concrete segments. Each upstanding segment has an outer surface with a relatively long lower edge, a relatively short upper edge, and a pair of converging side edges. The upstanding segments have a minimum thickness of between about 5 and 12", and slope upwardly and inwardly at a slope of about 3 to 1. Metal plates may be embedded on the side edges of the upstanding segments and connected to lateral tensile reinforcement in the segments. The metal plates of adjacent upstanding segments may then be welded together, connecting the tensile reinforcement in adjacent upstanding segments and securing the bell portion of the pedestal.

The upper edge of the bell portion supports a relatively-narrow, slender, shaft section that extends upwardly to the reservoir. The shaft section is cylindrical (that is, it has an outer profile that does not vary with height), and may be faceted. In one embodiment of the invention, the shaft section is no more than one-fourth the diameter of the reservoir, and may be made of rows of integral precast concrete ring sections. Reinforcement extends downwardly from the shaft section and projects through and is secured to interior shoulders on the upstanding segments.

When the shaft section is polygonal, a transition ring having a polygonal lower inner edge may be used to connect the upper edge of the shaft section to a lower edge of the reservoir.

DESCRIPTION OF THE DRAWINGS

The invention may be better understood by reference to the accompanying drawings, in which.

DETAILED DESCRIPTION OF THE INVENTION

Figure 1:
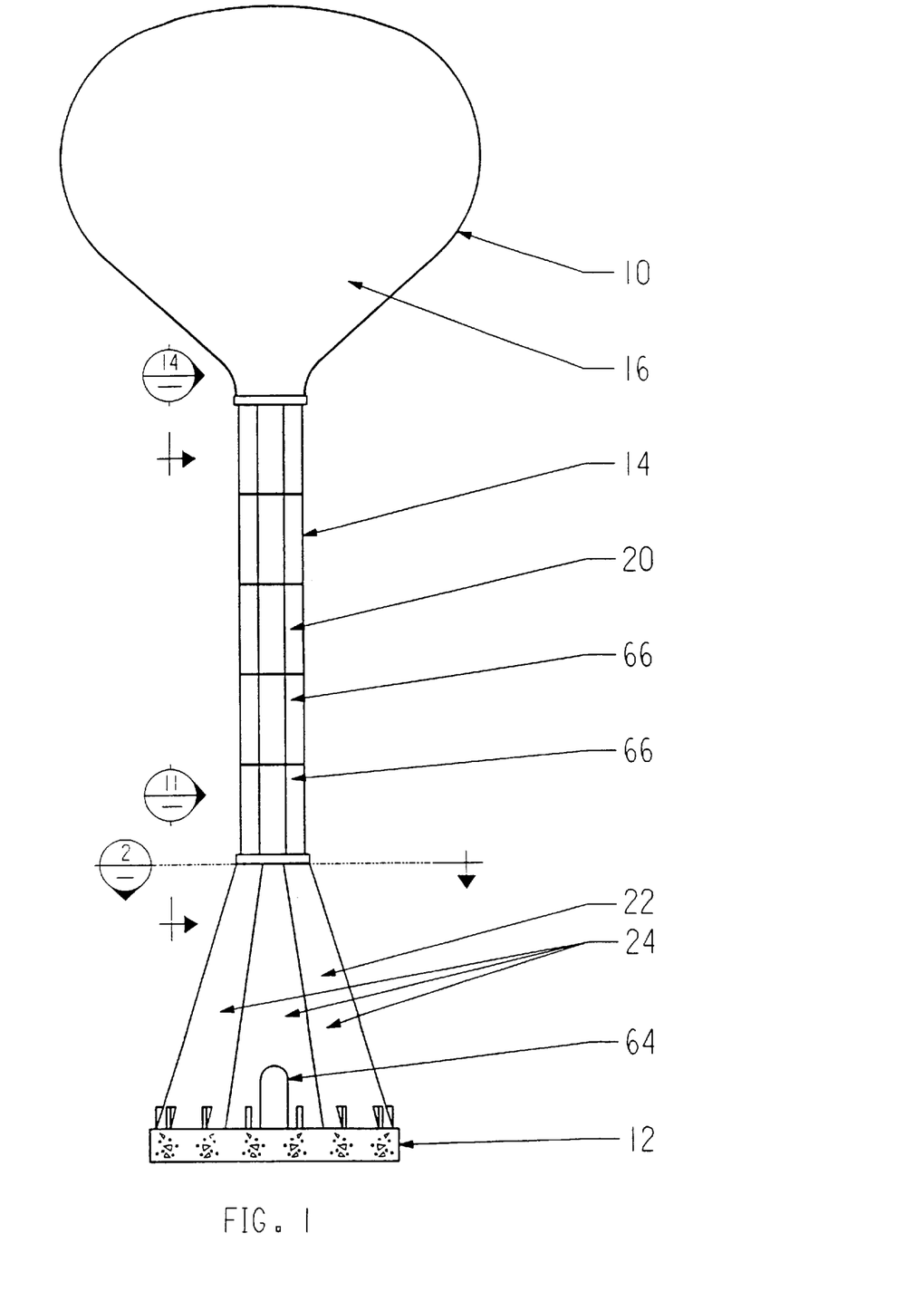
FIG. 1 is an elevational view of an embodiment of an elevated water tank in accordance with the present invention.

FIG. 1 shows an example of an elevated water tank 10 in accordance with the present invention. The tank 10 includes a traditional foundation 12, a concrete pedestal 14, and a reservoir 16. As illustrated, the tank is about 150 feet tall, and the 56 -foot diameter reservoir has a capacity of approximately 500,000 gallons.

As illustrated, the reservoir 16 is made of steel and is roughly spheroidal or ellipsoidal in shape. The use of steel provides good tensile strength, and allows the reservoir to be fashioned in many different shapes. The illustrated spherical shape is particularly efficient and aesthetically pleasing. However, other shapes, such as cylinders or ornamental shapes, can also be used.

The reservoir 16 is supported by the concrete pedestal 14. The pedestal is comprised of a cylindrical shaft section 20 and a bell portion 22. The illustrated pedestal has a polygonal cross-section that is constant throughout the shaft section. The bell portion is pyramidal; that is, it has converging outer surfaces 24 and a polygonal cross-section that decreases with height. Preferably, the decrease in the cross-section of the bell portion is linear (that is, the outer surfaces are generally planar and thus appear linear when viewed from an edge). Alternatively, the decrease could be geometric, resulting in the outer surfaces having a curved appearance when viewed from the side. As illustrated, the pedestal is about 26'6" wide across the flats at the bottom of the bell portion and a relatively narrow 8'6" wide at its minimum width across the flats at the top of the bell portion and throughout the shaft section. These dimensions can, of course, vary considerably depending upon local conditions and other design criteria. However, it is believed to be particularly economically advantageous to use a shaft section that is no more than about twelve feet wide, and no more than about one-fourth the width of the reservoir.

Figure 2:
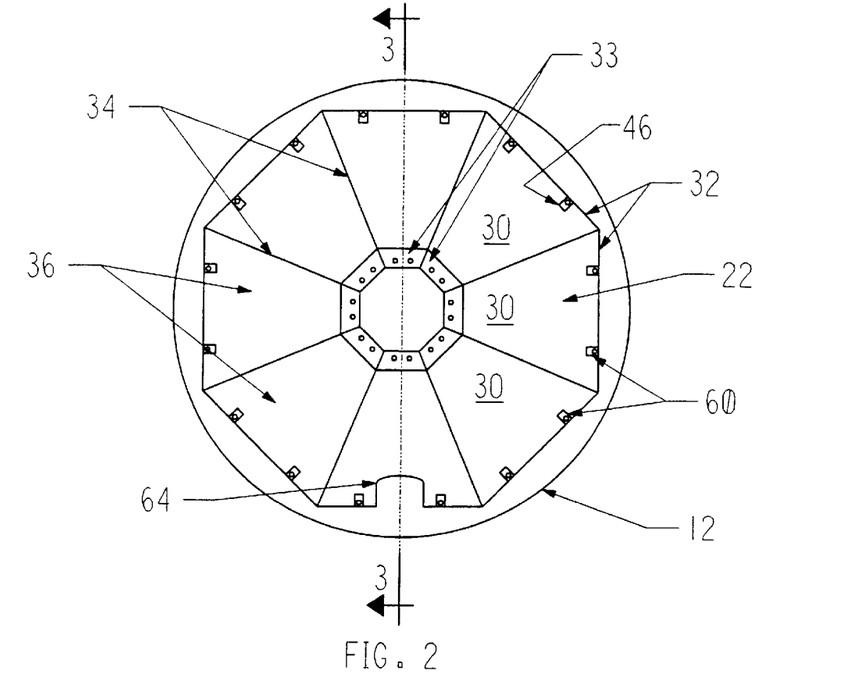
FIG. 2 is an enlarged, cross-sectional view through section 2—2 of FIG. 1.
Figure 3:
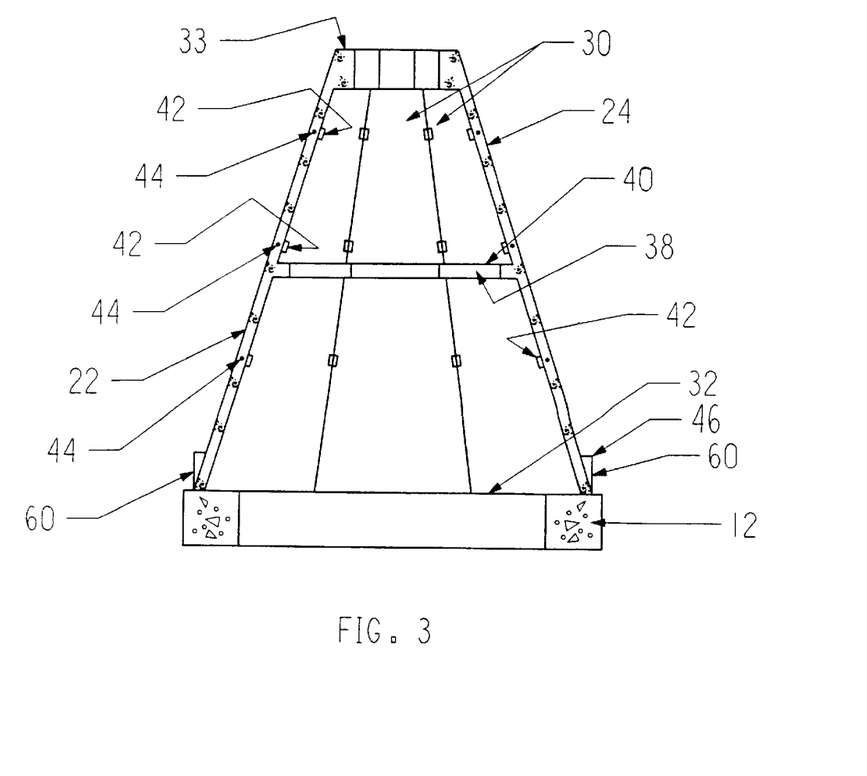
FIG. 3 is cross-sectional view through section 3—3 of FIG. 2.
Figure 17:
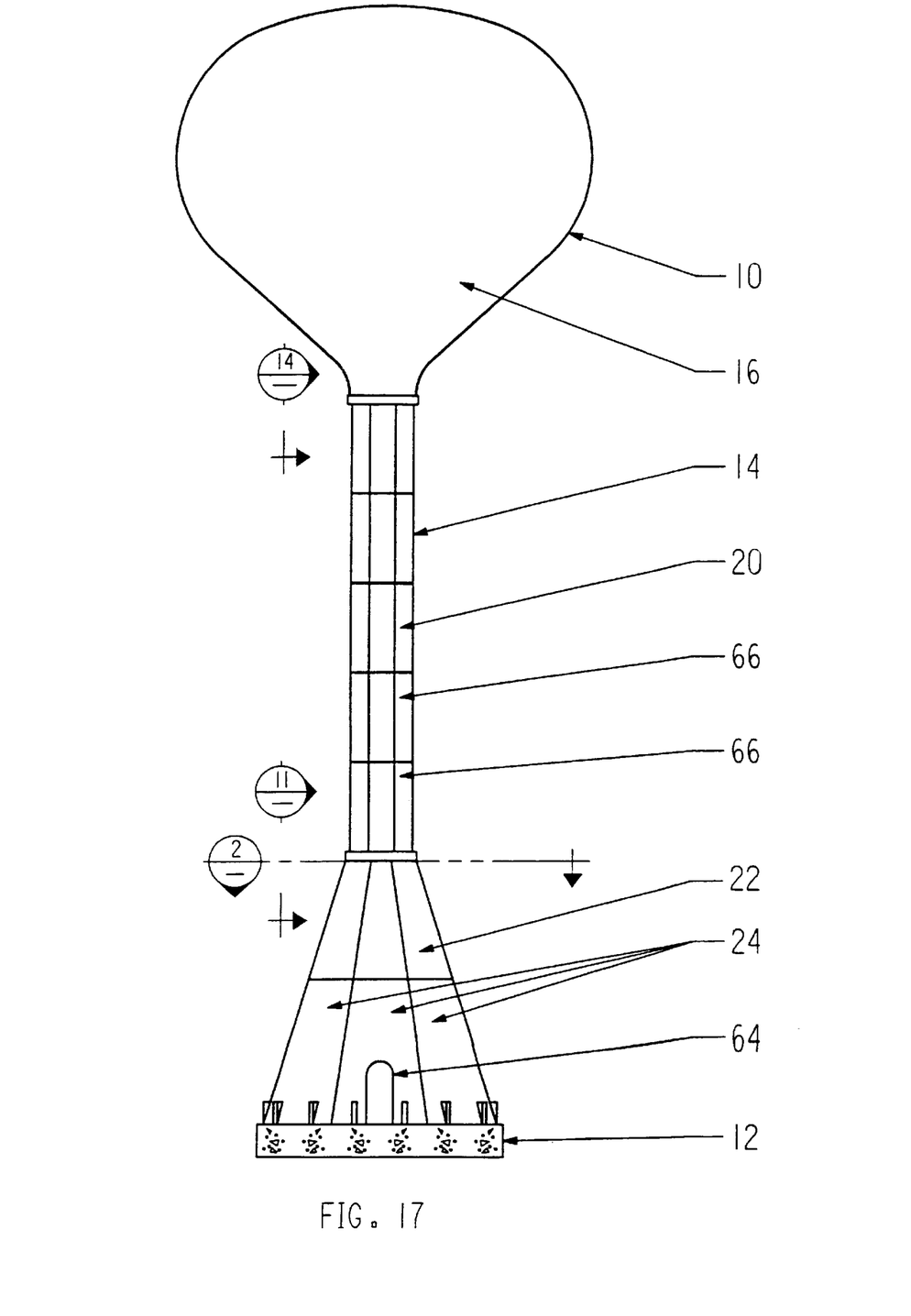
FIGS. 17–19 are views, corresponding to FIGS. 1, 2, and 3, respectively, of another alternative embodiment of the invention.
Figure 18:
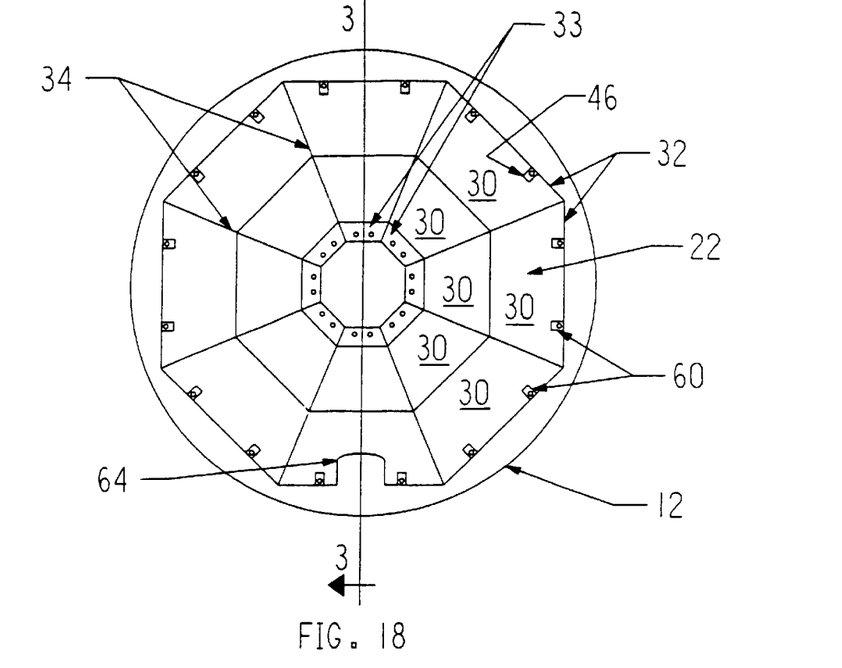
Figure 19:
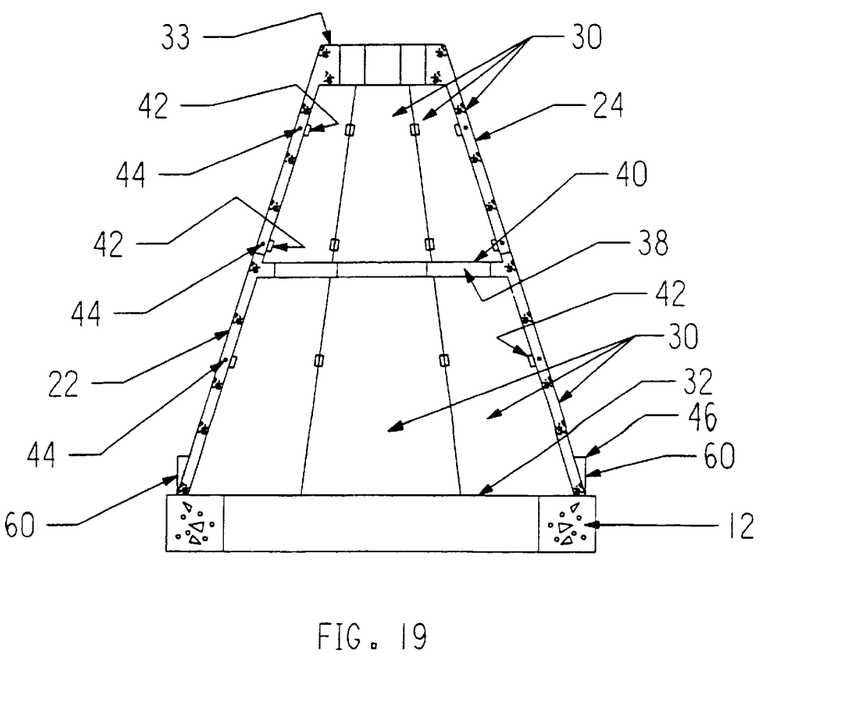

As seen in FIG. 2 and 3, the bell portion 22 of the pedestal 14 is constructed of a series of upstanding precast concrete segments 30. The outer surfaces 24 of the segments have a relatively long lower edge 32, a relatively short upper edge 33 that is parallel to the lower edge, and a pair of converging side edges 34. In the illustrated embodiment of the invention, the bell portion is made of eight upstanding segments made of about 8"-thick reinforced concrete with planar outer surfaces. Preferably, the thickness of each upstanding segment at its thinnest point is between about 5 and 12", and the outer surfaces slope linearly upwardly and inwardly at a slope of at least about 1 to 1 (that is, the outer surfaces form an angle of at least about 45° with respect to the ground). As illustrated, the upstanding segments are about 26' high, extending the full height of the bell portion of the pedestal, with the upper edges being about 3'6" long and the lower edges being about 11' long. These dimensions could vary. Alternatively, the bell portion could be formed of multiple courses of upstanding segments stacked one atop the other, as seen in FIGS. 17–19.

One advantage of the illustrated arrangement is that it facilitates the manufacture of multiple pedestals in different sizes. Specifically, by decreasing the width of the formwork used to create the upstanding segments 30 illustrated in FIGS. 2 and 3, upstanding segments can be created for a narrower bell portion. (If the bell portion 22 of the pedestal 14 had a round cross-section instead of a polygonal one, on the other hand, it would be necessary to provide formwork having a tighter outside radius in order to make a narrower bell portion.) Thus, the use of a bell portion having a polygonal cross-section provides an adaptability benefit.

In general, it is believed to be advantageous for the bell portion 22 of the pedestal 14 to have as few as six sides. However, the adaptability benefit is not limited to upstanding segments 30 that have a single, perfectly-planar side. Any segment that is predominately planar (i.e., that is not so curved as to limit its practical use to a bell portion of a specific size) should be viewed as "polygonal" as that term is intended here. For example, formwork used to create an upstanding segment having two adjacent planar faces meeting at an angle (even a rounded angle) between the converging side edges 34 can also provide an adaptability benefit so long as its configuration allows different-sized bell portions to be created by adjusting the edges of the forms, without changing the radius or configuration of the sides of the form corresponding to the outer surface of the segment. When a single upstanding segment has two planar outer faces, the bell portion could have as many as sixteen sides. When an upstanding segment has multiple outer faces, it is believed to be advantageous for those faces to be set at an angle of no less than 120 degrees with respect to each other.

It may be advantageous for the upstanding segments 30 to include a lateral reinforcing ring 38, seen in FIG. 3, between their upper edges 33 and the lower edges 32. Such a ring can strengthen the upstanding segment, allowing its predominant thickness to be reduced. The reinforcing ring can be disposed on either the inside or outside surfaces of the upstanding segments. As illustrated, the reinforcing ring includes a horizontal shelf 40 that serves as a supporting surface on the interior of the pedestal for supporting platforms or equipment.

The upstanding segments 30 of the bell portion 22 are joined together at their side edges 34. As illustrated, metal plates 42 are embedded on the side edges of the upstanding segments, and are connected to lateral tensile reinforcement 44 in the segments. The metal plates of adjacent upstanding segments are welded together, connecting the lateral tensile reinforcement in adjacent upstanding segments and thus securing the individual upstanding segments together. The segments could be joined together in other ways.

Figure 4:
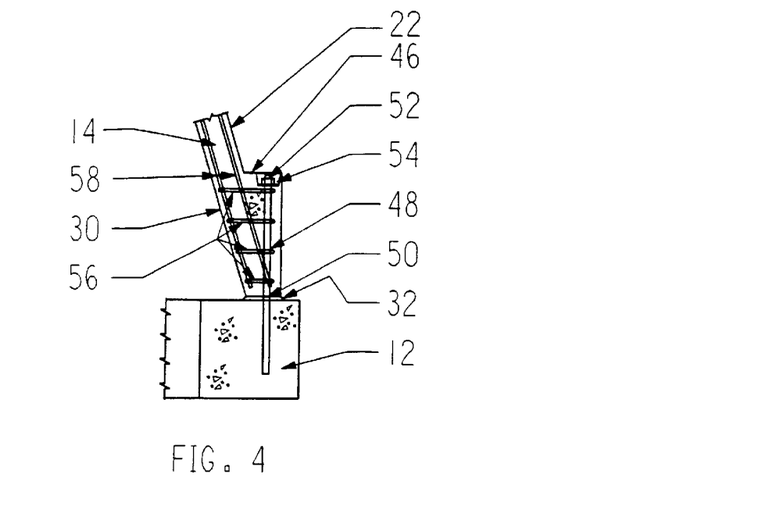
FIG. 4 is an enlarged, fragmentary view through a portion of FIG. 3.

As seen in FIG. 4, the lower edges 32 of the upstanding segments 30 that form the bell portion 22 of the pedestal 14 may be secured to the foundation 12 by anchorage that extends upwardly from the foundation and projects to exterior shoulders 46 near the lower edge 32 of the upstanding segments in order to transfer tension and shear from the bell portion to the foundation. As illustrated, the anchorage is in the form of a series of anchor bolts 48, and the exterior shoulder is about 10" wide, and is located about 3'6" directly above the foundation. It is preferable that the shoulder be at least about 6" directly above an anchor point 50 between the foundation and the bell portion of the pedestal. The anchor bolts are secured by nuts 52 that bear on a pocket 54 in the exterior shoulder. Other forms of anchorage could also be used. As illustrated, reinforcements 56 join the anchor bolts to sloping reinforcement 58 that extends through the height of the upstanding segments.

Figure 5:
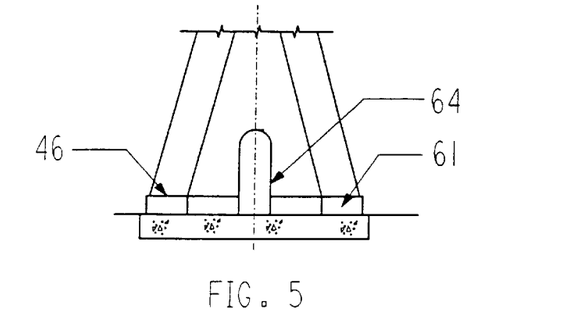
FIG. 5 is an enlarged, partial side view of an alternative embodiment of the invention.

As illustrated in FIGS. 2 and 3, the exterior shoulders 46 are formed on corbels 60 spaced about the bell portion 22 of the pedestal. The use of corbels minimizes the amount of material used in forming the segments. Alternatively, as seen in FIG. 5, the shoulders could be formed on a continuous ring 61 around substantially the entirety of the bell portion. In either case, it is advantageous to leave room for a doorway 64.

Figure 6:
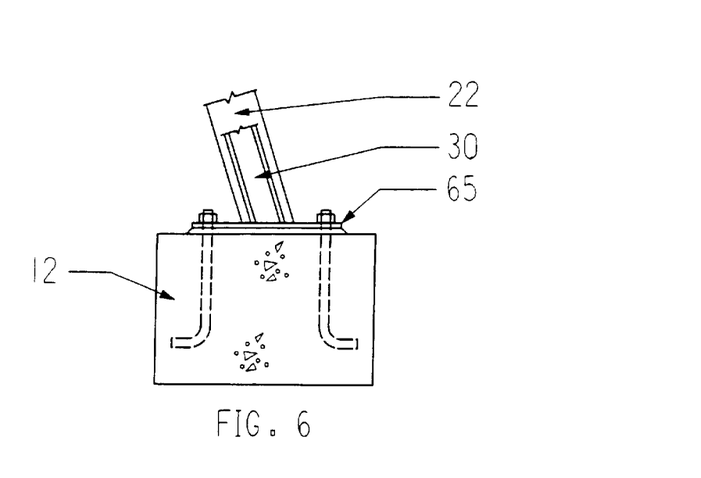
FIG. 6 is a view, corresponding to FIG. 4, of an alternative embodiment of the invention.

As seen in FIG. 6, the upstanding segments 30 that form the bell portion 22 could alternatively be secured to the foundation 12 by an anchored metal plate 65. Other forms of connection could also be used.

Figure 7:
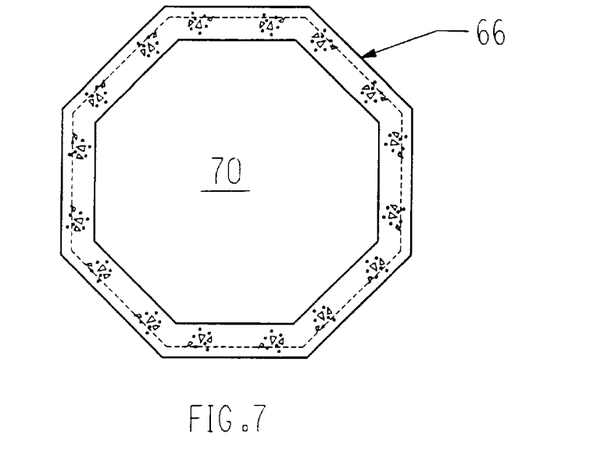
FIG. 7 is an enlarged, cross-sectional plan view of ring sections in the shaft section of the pedestal.

As illustrated in FIG. 1, the cylindrical shaft section 20 comprises a series of five concrete ring sections 66 mounted atop the bell portion 22. As seen in FIG. 7, the ring sections 66 have a hollow interior 70 that provides space for piping and internal access to the reservoir 16. As illustrated, the ring sections measure about 8'6" across the flats and are about 11' tall. The number of ring sections and their sizes can vary. It is advantageous, however, for all or most of the ring sections to be a uniform height and formed from the same mold or forms. A subsequent tank can then be built with a different height by simply changing the number of ring sections and/or modifying the height of a single ring section. It is also useful, but not necessary, that the upper edge of the uppermost ring section (which is connected to the reservoir 16 or to a transition ring 72 rather than to another ring section) is cast from the same form as the lower edge of the lowermost ring section (which is connected to the bell portion 22 rather than to another ring section).

Figure 8:
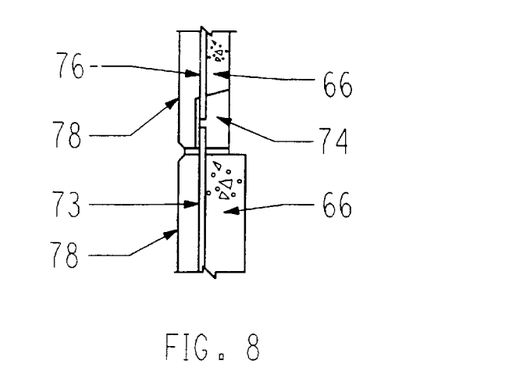
FIG. 8 is an enlarged, cross-sectional elevational view of two ring sections in the shaft section of the pedestal.

As illustrated in FIG. 8, adjacent ring sections 66 are shimmed and grouted to maintain the alignment of the pedestal. Alternatively, the upper and lower ends of adjacent ring sections could be provided with match-cast adjoining edges that are bonded with adhesive. As still another alternative, the rough edge of each ring section could be milled after casting, enabling the use of a chemical or mechanical means to bond or join the milled edge of one ring section to the cast edge of an adjacent ring section.

Axial and transverse loads can be passed between adjacent ring sections 66 in any conventional way. As illustrated in FIG. 8, the ring sections 66 includes a projecting #9 steel reinforcement bar 73 that extends 6" upwardly from the upper edges of the ring sections. This bar is received and seated in a pocket 74 on the lower inside edge of the next ring section 66, where it is connected to the lower end of the reinforcing bar in that ring section. The connection could be made with a splice angle, or in other ways known in the trade. After the bars are connected, the pocket is grouted. Axial and transverse loads could be passed in other ways. For example, the steel reinforcement could be seated in ducts 75, such as those seen in FIG. 9, or vertical post-tensioning 76 could be used to pass loads between adjacent ring sections.

Figure 10:
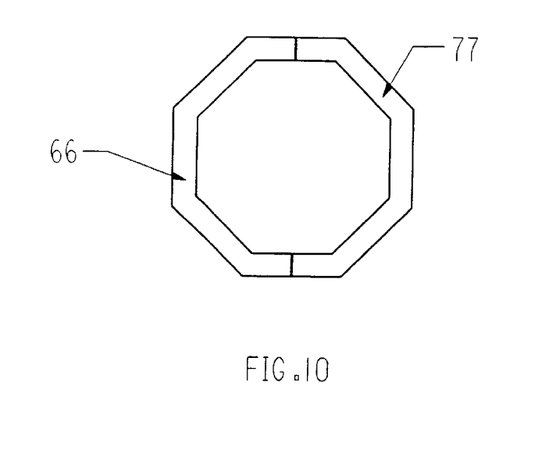
FIG. 10 is a view, corresponding to FIG. 7, of an alternate embodiment of the invention.

As illustrated, the slender width of the shaft section 20 enables the use of ring sections 66 that are integral; that is, formed as a single piece. Alternatively, each ring section could be made of separate ring section segments that are connected together after casting. For example, as seen in FIG. 10, each ring section could be made of roughly u-shaped ring section segments 77 that are chemically bonded or mechanically joined after casting. When using non-integral ring sections, however, it may be important to stagger the vertical seams between separate ring section segments from one ring section to the next throughout the height of the shaft section.

Figure 9:
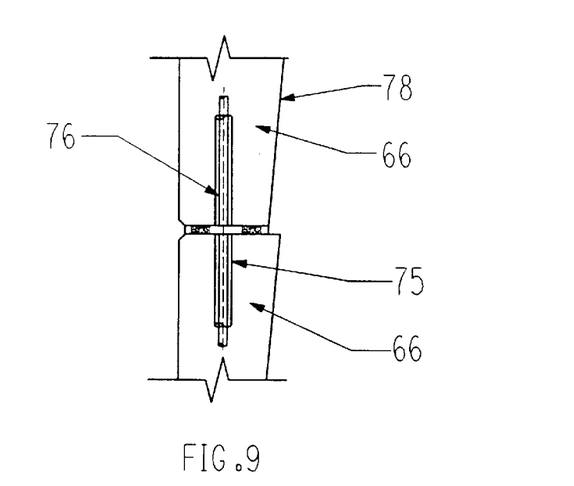
FIG. 9 is an enlarged view, corresponding to FIG. 8 of an alternate embodiment of the invention.

As seen in FIGS. 8 and 9, the walls of the ring sections 66 vary in thickness from about 9" at the upper edge to about 7" at the lower edge. This difference in thickness facilitates stripping of the formwork. Alternatively, a collapsing form could be used to provide a constant wall thickness. To provide resistance to weathering and better aesthetics, the outside surfaces 78 of the ring sections are kept generally continuous, as seen in FIG. 8. To facilitate shipping, the ring sections preferably have a width of no more than 15 feet.

Figure 11:
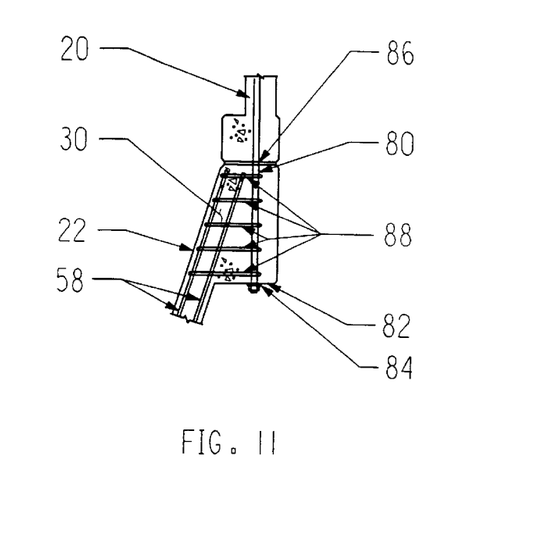
FIG. 11 is an enlarged, fragmentary elevational view of section 11—11 of FIG. 1.
Figure 12:
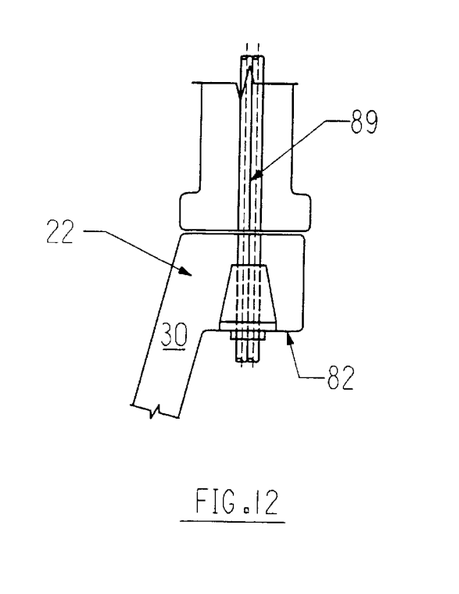
FIG. 12 is a view corresponding to FIG. 11, of an alternate embodiment of the invention.

As seen in FIG. 11, the shaft section 20 is secured to upper edges of the upstanding segments 30 that form the bell portion 22 by reinforcement in the form of a #10 steel reinforcement bar 80 that extends downwardly from the shaft section. The bar projects 3" through interior shoulders 82 near the top of the upstanding segments that form the bell portion, and is secured to the shoulders by nuts 84. As illustrated, the interior shoulders are horizontal faces about 14" wide that are disposed about 4' directly below the top edge of each upstanding segment. These dimensions could vary, but it is preferable that the interior shoulders be at least about 6" directly beneath a connection point 86 between the bell portion of the pedestal and the portion of the tank above the bell portion (here, the shaft section 20). Reinforcements 88 join the steel reinforcement to the sloping tensile reinforcement 58 that extends through the height of the upstanding segments. These reinforcements enable axial and transverse loads to be transferred from the shaft section to the bell portion of the pedestal Axial and transverse loads could, again, be passed in other ways. For example, as seen in FIG. 12, the reinforcement extending downwardly from above the bell portion 22 could be a set of post-tensioned tendons 89.

Figure 13:
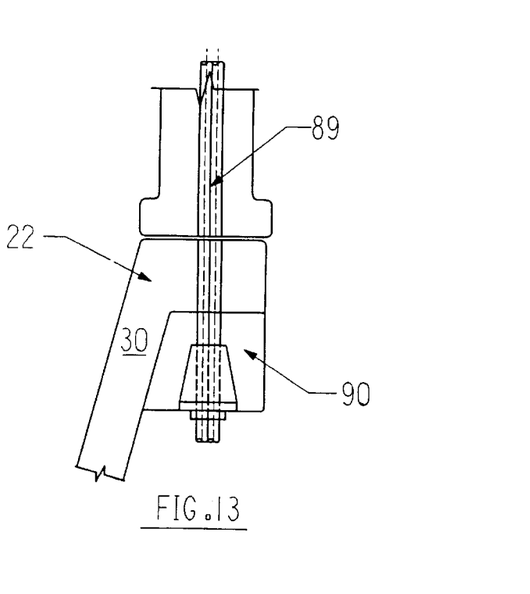
FIG. 13 is a view, corresponding to FIG. 12, of another alternate embodiment of the invention.

As illustrated, the interior shoulders 82 form a continuous ring around substantially the entirety of the bell portion 22 of the pedestal 14. Alternatively, as seen in FIG. 13, the shoulders could form discontinuous corbels 90 spaced about the bell portion of the pedestal. The use of corbels would minimize the amount of material used.

Figure 14:
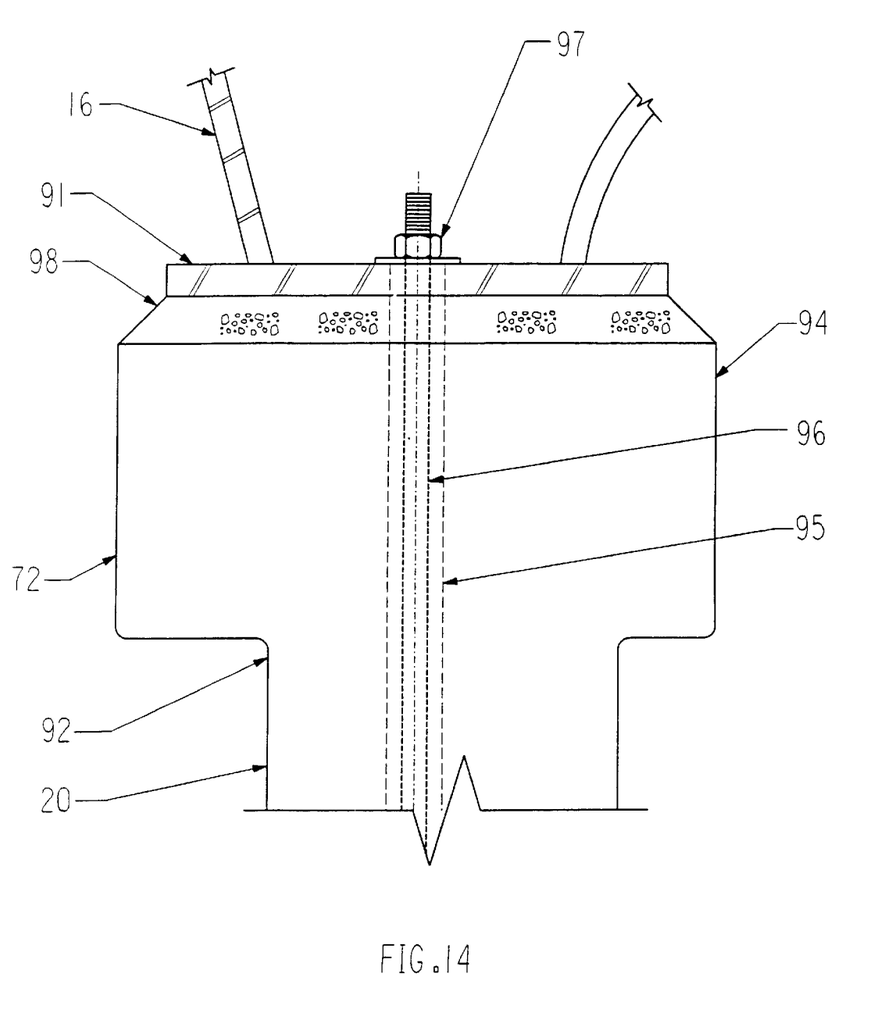
FIG. 14 is an enlarged, cross-sectional view through section 14—14 of FIG. 1.
Figure 15:
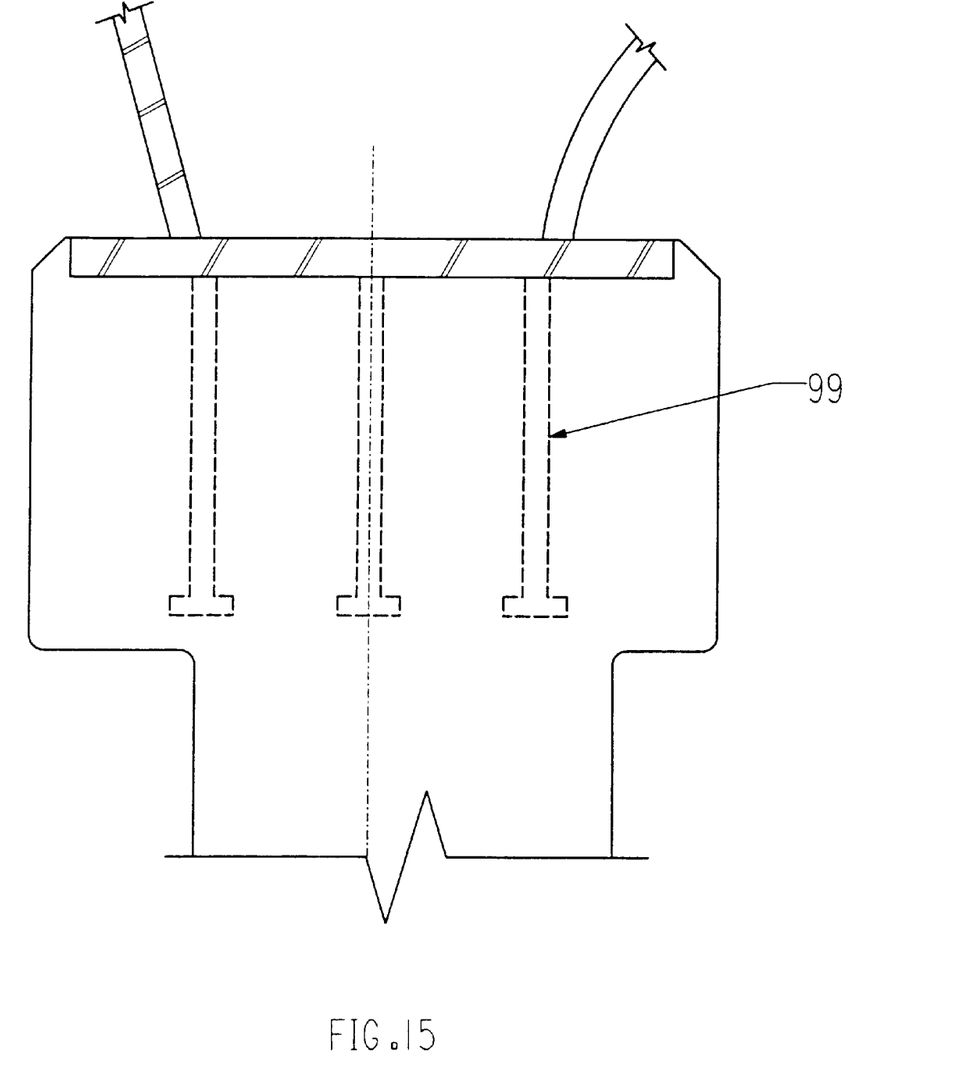
FIG. 15 is a view, corresponding to FIG. 14, of an alternative embodiment of the invention.
Figure 16:
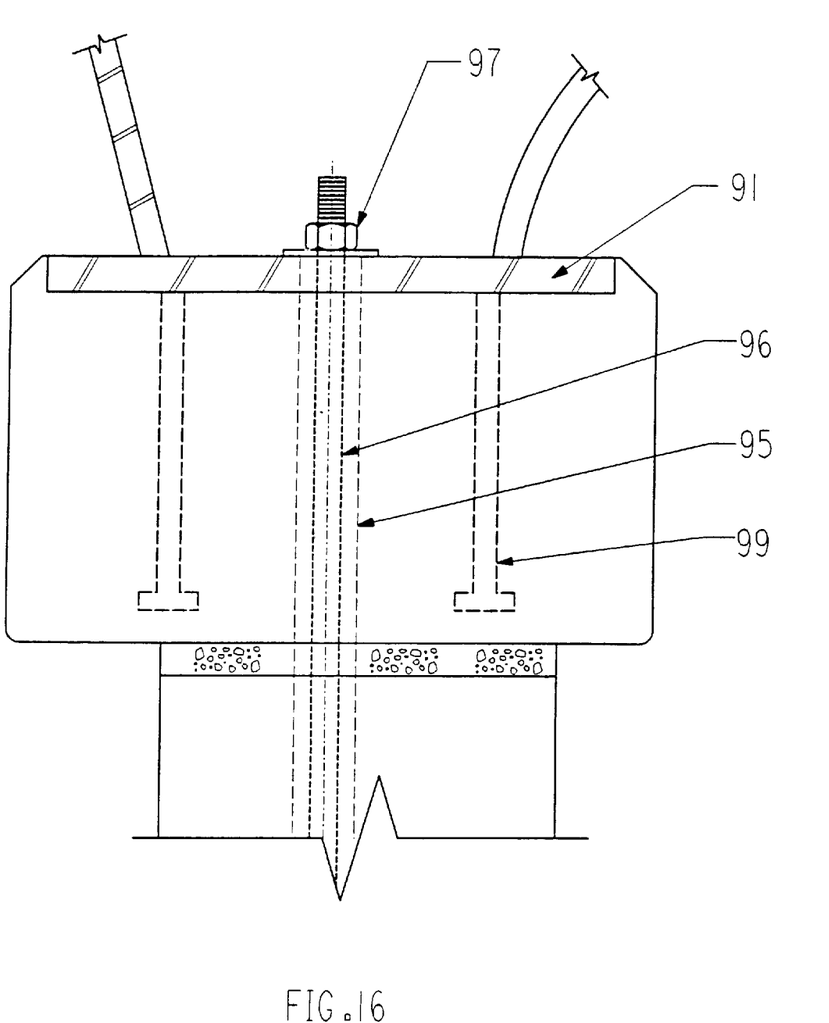
FIG. 16 is a view, corresponding to FIG. 14, of another alternative embodiment of the invention.

As seen in FIG. 14, the transition ring 72 may be used to connect the upper end of the shaft section 20 with a lower edge on the reservoir 16. The illustrated transition ring has a polygonal lower inner edge 92 and a circular upper edge 94 that connects to a plate 91 welded to the lower edge of the reservoir. As illustrated, the transition ring is made of precast concrete, is about 12" high, and includes a duct 95. Reinforcement 96 extending upwardly from the shaft section 20 extends through the duct and is secured by an anchor nut 97. Shims and grout 98 are used between the plate and the transition ring to level and support a base plate 91. Alternatively, as seen in FIGS. 15 and 16, anchor studs 99 could be used to secure the reservoir 16 to the pedestal 14. If necessary, the upper edge could have a different shape to join to the lower edge of the reservoir.

This detailed description has been given for clarity of understanding only. It is not intended and should not be construed as limiting the scope of the invention, which is defined in the following claims.

We claim:

1. An elevated water tank comprising:
   a concrete pedestal with a bell portion having a generally polygonal cross-section and a cylindrical shaft section connected to the top of the bell portion; and
   a reservoir atop the shaft section.

2. An elevated tank as recited in claim 1, in which the bell portion has between 5 and 24 sides.

3. An elevated tank as recited in claim 1, in which:
   the bell portion is comprised of a series of upstanding segments, each upstanding segment having a relatively long lower edge, a relatively short upper edge, and a pair of converging side edges.

4. An elevated tank as recited in claim 3, in which the thickness of the upstanding segments at their thinnest point is between about 5 and 12", and the segments slope linearly upwardly and inwardly at a slope of at least about 1 to 1.

5. An elevated tank recited in claim 3, in which:
   each upstanding segment includes lateral reinforcement; and
   the lateral reinforcement in adjacent upstanding segments are connected together.

6. An elevated tank as recited in claim 3, in which:
   metal plates are embedded in the upstanding segments, and
   the metal plates of adjacent upstanding segments are connected together.

7. An elevated tank as recited in claim 3, in which the upstanding segments have generally planar outer faces.

8. An elevated tank as recited in claim 3, in which the upstanding segments have two generally planar outer faces set at an angle of no less than 120 degrees.

9. An elevated tank as recited in claim 3, in which:
   lower edges of the upstanding segments are secured to a foundation, and upper edges of the upstanding segments are secured to a cylindrical portion of the tank above the bell portion of the pedestal.

10. An elevated tank as recited in claim 9, in which at least some of the upstanding segments extend the full height of the bell portion of the pedestal.

11. An elevated tank as recited in claim 9, in which the bell portion includes multiple courses of upstanding segments.

12. An elevated tank as recited in claim 9, in which the upstanding segments are secured to the foundation by an anchored metal plate.

13. An elevated tank as recited in claim 9, in which the upstanding segments are secured to the foundation by anchorage that extends upwardly from the foundation and projects to shoulders near the lower edge of the upstanding segments.

14. An elevated tank as recited in claim 13, in which the shoulders are at least about 6" directly above an anchor point between the foundation and the bell portion of the pedestal.

15. An elevated tank as recited in claim 13, in which the shoulders form a continuous ring around substantially the entirety of the bell portion.

16. An elevated tank as recited in claim 13, in which the upstanding shoulders form discontinuous corbels spaced about the bell portion.

17. An elevated tank as recited in claim 13, and further comprising connections between the anchorage extending upwardly from the foundation and tensile reinforcement extending through the height of the upstanding segments.

18. An elevated tank as recited in claim 3, in which:
the upstanding segments include a lateral reinforcing ring between the upper and lower edges.

19. An elevated tank as recited in claim 18, in which the lateral reinforcing ring includes a supporting surface for platforms or equipment on the interior of the pedestal.

20. An elevated tank as recited in claim 1, in which the pedestal comprises a cylindrical shaft section atop a pyramidal bell portion.

21. An elevated tank as recited in claims 1, in which:
a transition ring having a polygonal lower edge connects the upper edge of the pedestal to a lower edge on the reservoir.

22. An elevated tank as recited in claim 1, in which the pedestal is comprised of courses of concrete ring sections.

23. An elevated tank as recited in claim 22, in which each ring section is made of separate ring section segments that are connected together after casting, and seams between separate ring section segments are staggered from one ring section to the next.

24. An elevated tank as recited in claim 22, in which adjacent ring sections have match-cast adjoining edges.

25. An elevated tank as recited in claim 22, in which each of the ring sections has a milled edge.

26. An elevated tank as recited in claim 22, in which one edge of a ring section is adhesively bonded to the edge of an adjacent ring section.

27. An elevated tank as recited in claim 22, in which adjacent ring sections are shimmed and grouted.

28. An elevated tank as recited in claim 22, in which steel reinforcement splices join adjacent ring sections.

29. An elevated tank as recited in claim 22, in which the ring sections include aligned vertical ducts containing reinforcement.

30. An elevated tank as recited in claims 22, in which the ring sections include grouted ducts that receive reinforcement disposed within adjacent ring sections.

31. An elevated tank as recited in claim 22, in which the lower edge of the lowermost ring section is cast from the same form as the upper edge of the uppermost ring section.

32. An elevated tank as recited in claim 22, in which a transition ring having a polygonal lower edge connects the upper edge of the pedestal to a lower edge on the reservoir.

33. An elevated tank as recited in claim 22, in which the ring sections are cast as integral units.

34. An elevated tank as recited in claim 22, in which the cast ring sections have a width of no more than 20 feet.

35. An elevated tank as recited in claim 22, and further comprising vertical post-tensioning between adjacent ring sections.

36. An elevator tank comprising:
a pedestal with a bell portion and a cylindrical shaft section adjacent to the top of the bell portion, the bell portion having a generally polygonal cross-section; and
a reservoir atop the shaft section.

37. An elevated tank as recited in claim 36, in which:
reinforcement extends downwardly from a portion of the tank above the bell portion and projects through interior shoulders near the top of the bell portion; and
the reinforcement is secured to the interior shoulders.

38. An elevated tank as recited in claim 37, in which the interior shoulders are at least about 6" directly beneath a connection point between the bell portion of the pedestal and a portion of the tank above the bell portion.

39. An elevated tank as recited in claim 37, in which the interior shoulders form a continuous ring around substantially the entirety of the bell portion.

40. An elevated tank as recited in claim 37, in which the upstanding shoulders form corbels spaced about the bell portion.

41. An elevated tank as recited in claim 37, and further comprising reinforcements between the reinforcement extending downwardly from above the bell portion and reinforcement extending through the height of the upstanding segments.

42. An elevated tank as recited in claim 37, in which the reinforcement extending through interior shoulders near the top of the bell portion is steel reinforcement.

43. An elevated tank as recited in claim 37, in which the reinforcement extending through interior shoulders near the top of the bell portion is a set of post-tensioned tendons.

44. An elevated water tank comprising:
a pedestal with both a bell portion having a generally polygonal cross-section and an elongated concrete shaft section having a relatively narrow minimum width; and
a reservoir atop the pedestal, the reservoir having a width that is at least about four times greater than the minimum width of the pedestal.

45. An elevated tank as recited in claim 44, in which the shaft section of the pedestal has a polygonal cross-section with the same number of sides as the bell portion.

46. An elevated tank as recited in claim 44, in which the shaft section of the pedestal is secured to the bell portion of the pedestal by reinforcement that extends downwardly from the shaft section and projects through interior shoulders near the top of the bell portion.

* * * * *